(12) United States Patent
Sakurai et al.

(10) Patent No.: US 8,913,115 B2
(45) Date of Patent: Dec. 16, 2014

(54) IRRADIATION TIME CONTROL IMAGING DEVICE AND IRRADIATION TIME CONTROL ENDOSCOPE DEVICE

(75) Inventors: Tetsuo Sakurai, Kumagaya (JP); Bin Qi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 141 days.

(21) Appl. No.: 13/407,391

(22) Filed: Feb. 28, 2012

(65) Prior Publication Data

US 2013/0050456 A1 Feb. 28, 2013

(30) Foreign Application Priority Data

Aug. 29, 2011 (JP) ................. 2011-186201

(51) Int. Cl.
*H04N 7/18* (2006.01)
*H04N 5/235* (2006.01)
*H04N 5/232* (2006.01)
*H04N 5/353* (2011.01)
*H04N 5/225* (2006.01)

(52) U.S. Cl.
CPC ................ *H04N 5/2354* (2013.01); *H04N 7/18* (2013.01); *H04N 5/23254* (2013.01); *H04N 5/353* (2013.01); *H04N 2005/2255* (2013.01)
USPC .................. 348/68; 348/61; 348/65

(58) Field of Classification Search
CPC ................ H04N 2005/2255; H04N 19/00024; H04N 19/00145; H04N 19/00266; H04N 19/00484; H04N 19/0063; H04N 19/0066; H04N 5/2251; H04N 5/2252; H04N 5/2253; H04N 5/232; H04N 5/23248; H04N 5/23261
USPC .......................................... 348/68
See application file for complete search history.

(56) References Cited

U.S. PATENT DOCUMENTS

| 5,608,451 | A | * | 3/1997 | Konno et al. | 348/69 |
| 6,319,198 | B1 | * | 11/2001 | Takahashi | 600/180 |
| 6,707,485 | B1 | | 3/2004 | Higuchi et al. | |
| 7,983,458 | B2 | | 7/2011 | Wang et al. | |
| 8,073,223 | B2 | | 12/2011 | Wilson et al. | |
| 8,165,370 | B2 | * | 4/2012 | Inoue et al. | 382/128 |
| 8,165,374 | B1 | * | 4/2012 | Wang et al. | 382/128 |
| 8,259,167 | B2 | * | 9/2012 | Ishiwata et al. | 348/65 |
| 2009/0322865 | A1 | * | 12/2009 | Wang et al. | 348/68 |

FOREIGN PATENT DOCUMENTS

| JP | 08-015617 | 1/1996 |
| JP | 09-024023 | 1/1997 |

(Continued)

OTHER PUBLICATIONS

Japanese Patent Application No. 2011-186201, Notice of Reasons for Rejection, mailed Jul. 10, 2012, (with English Translation).

*Primary Examiner* — Jessica M Prince
(74) *Attorney, Agent, or Firm* — Blakely, Sokoloff, Taylor & Zafman LLP

(57) ABSTRACT

An imaging device includes: an imaging module configured to have a plurality of photoelectric conversion elements corresponding to a frame composed of a plurality of lines, with start of an accumulation period of electric charge by the plural photoelectric conversion elements being different depending on each of the lines, and reading the accumulated electric charge to repeatedly output the read electric charge as an image signal; a light source configured to irradiate an imaging range of the imaging module; and a controller configured to control an irradiation time of the light source according to a motion of an image captured by the imaging module.

18 Claims, 8 Drawing Sheets

(56) References Cited

FOREIGN PATENT DOCUMENTS

| JP | 11-244231   | 9/1999 |
| JP | 3429607     | 6/2003 |
| JP | 2008-136721 | 6/2008 |
| JP | 2009-513283 | 4/2009 |

* cited by examiner

| COMPARISON RESULT | IRRADIATION TIME | LUMINANCE (LIGHTNESS) |
|---|---|---|
| $V_M > TH_2$ | $T_1$ | $B_1$ |
| $TH_2 \geq V_M \geq TH_1$ | $T_2$ | $B_2$ |
| $TH_1 > V_M$ | $T_3$ | $B_3$ |

| COMPARISON RESULT | IRRADIATION TIME | LUMINANCE (LIGHTNESS) | OPERATION MODE |
|---|---|---|---|
| $V_M > TH_2$ | $T_1$ | $B_1$ | FIRST |
| $TH_2 \geqq V_M \geqq TH_1$ | $T_2$ | $B_2$ | FIRST |
| $TH_1 > V_M$ | $T_4$ | $B_4$ | SECOND |

IRRADIATION TIME CONTROL IMAGING DEVICE AND IRRADIATION TIME CONTROL ENDOSCOPE DEVICE

CROSS-REFERENCE TO RELATED APPLICATION

This application is based upon and claims the benefit of priority from the prior Japanese Patent Application No. 2011-186201, filed on Aug. 29, 2011; the entire contents of all of which are incorporated herein by reference.

FIELD

Embodiments described herein relate generally to an imaging device and an endoscope device.

BACKGROUND

There is an imaging device using a CCD image sensor as an image sensor. The CCD image sensor converts light to electric charge (photoelectric conversion) and accumulates the converted electric charge. The CCD image sensor reads the electric charges accumulated in photosensors by a method called a global shutter method (global exposure). In the global shutter method, the electric charges accumulated in the photosensors corresponding to all pixels are synchronously read. Accordingly, the CCD image sensor has a characteristic that a distortion does not easily occur in an image that it captures even when a subject is moving.

DETAILED DESCRIPTION

An imaging device according to an embodiment includes: an imaging module having a plurality of photoelectric conversion elements corresponding to a frame composed of a plurality of lines; a light source irradiating an imaging range of the imaging module; and a controller controlling an irradiation time of the light source according to a motion of an image captured by the imaging module. In the imaging module, a start of an accumulation period of electric charge by the plural photoelectric conversion elements is different depending on each of the lines, and the imaging module reads the accumulated electric charge to repeatedly output the read electric charge as an image signal.

Hereinafter, embodiments will be described with reference to the drawings.

First Embodiment

Figure 1:
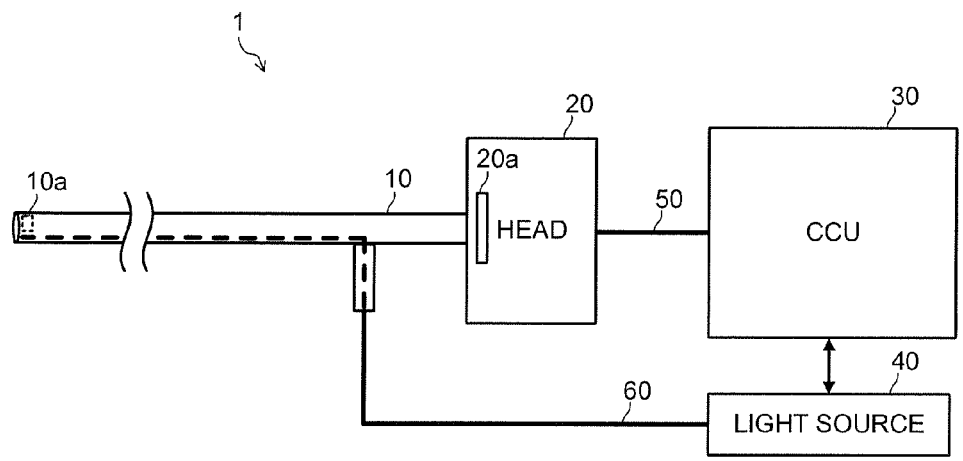
FIG. 1 is a block diagram of an endoscope device according to a first embodiment.

In the first embodiment, the structure of an imaging device will be described, taking an endoscope device as an example. FIG. 1 is a block diagram of an endoscope device 1 according to the first embodiment (hereinafter, referred to as the endoscope device 1). In the first embodiment, an embodiment where a CMOS image sensor is adopted as an image sensor will be described. Note that the endoscope device 1 may be a hard endoscope device or may be a soft endoscope device. The hard endoscope device means an endoscope device of a hard type whose scope inserted into an inspection target is not bendable. The soft endoscope device means an endoscope device of a soft type whose scope inserted into an inspection target is bendable.

The endoscope device 1 includes a scope 10, a head 20, a CCU (Camera Control Unit) 30, a light source 40, a camera cable 50, and an optical fiber 60. The scope 10 has an objective lens 10a at its tip and is inserted into an inspection target. The head 20 outputs a signal of an image captured by a CMOS image sensor 20a (imaging module) located on an imaging plane of the objective lens 10a to the CCU 30 via the camera cable 50. The CCU 30 processes the image signal output from the head 20. The light source 40 illuminates (hereinafter, referred to as irradiates) an imaging range. The camera cable 50 houses a signal line for transmitting/receiving the image signal and a control signal between the head 20 and the CCU 30, a power line for supplying power from the CCU 30 to the head 20, and so on. The optical fiber 60 leads light from the light source 40 to the tip portion of the scope 10.

Figure 2:
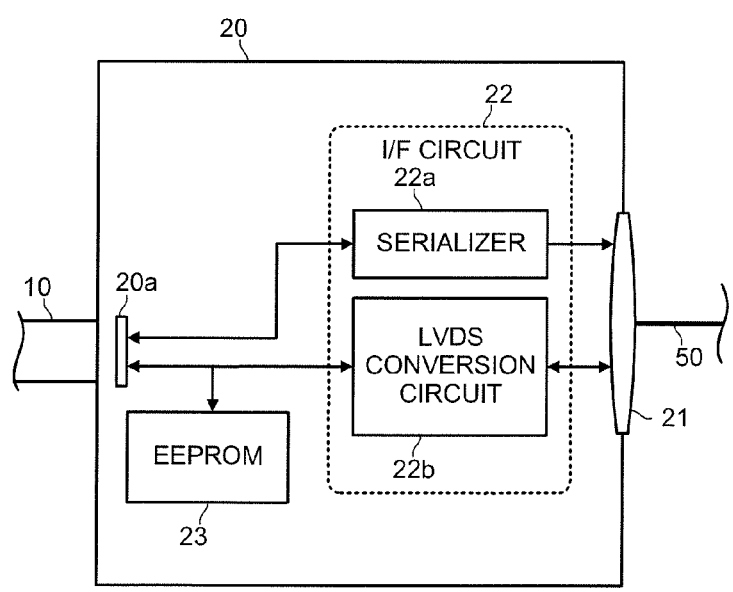
FIG. 2 is a block diagram of a head included in the endoscope device according to the first embodiment.

FIG. 2 is a block diagram of the head 20. The head 20 includes the CMOS image sensor 20a, a connection terminal 21, an I/F circuit 22, and a memory 23. The CMOS image sensor 20a is a color CMOS image sensor compatible with full HD (high definition). In the first embodiment, the CMOS image sensor 20a is driven by progressive scanning but may be driven by interlaced scanning.

The camera cable 50 is connected to the connection terminal 21. The I/F circuit 22 includes a serializer 22a and a LVDS conversion circuit 22b. The I/F circuit 22 transmits the image signal output from the CMOS image sensor 20a to the CCU 30 via the camera cable 50 connected to the connection terminal 21 while keeping the image signal as a digital signal. The memory 23 is a rewritable memory (for example, a flash memory or the like) and stores setting conditions (for example, a frame rate, a gain, and so on) of the CMOS image sensor 20a. As the memory 23 storing the setting conditions, any memory is also usable other than the flash memory, provided that it is rewritable. In the first embodiment, a description is given on assumption that the frame rate is 60 fps (frames per second).

Figure 3:
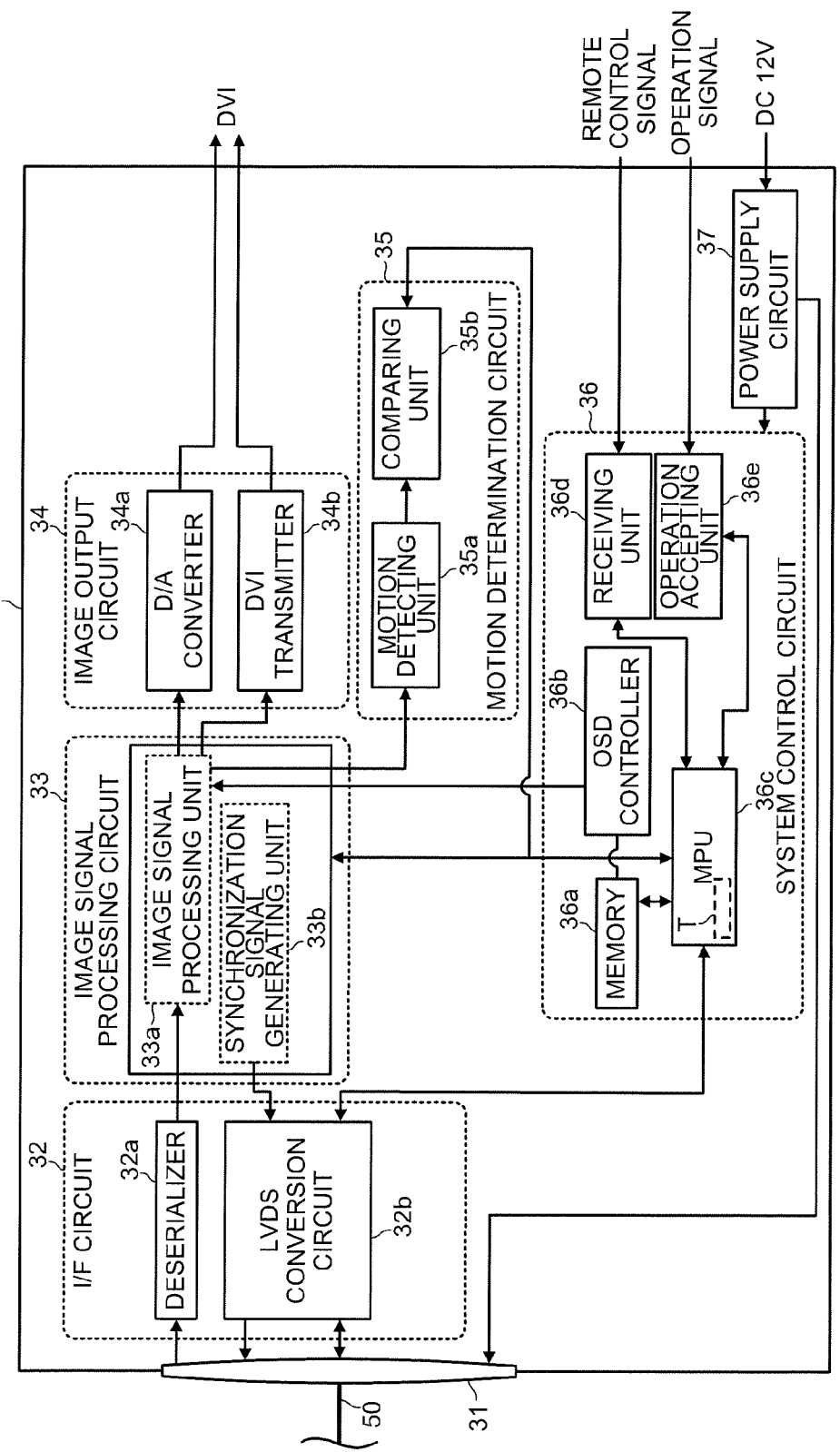
FIG. 3 is a block diagram of a CCU included in the endoscope device according to the first embodiment.

FIG. 3 is a block diagram of the CCU 30. The CCU 30 includes a connection terminal 31, an I/F circuit 32, an image signal processing circuit 33, an image output circuit 34, a motion determination circuit 35, a system control circuit 36, and a power supply circuit 37. The camera cable 50 is connected to the connection terminal 31. The I/F circuit 32 includes a deserializer 32a and a LVDS conversion circuit 32b. The I/F circuit 32 transmits the image signal transmitted from the head 20, to the image signal processing circuit 33. The I/F circuit 32 transmits the control signal output from the system control circuit 36, to the head 20 via the camera cable 50 connected to the connection terminal 31.

The image signal processing circuit 33 includes an image signal processing unit 33a and a synchronization signal generating unit 33b. The image signal processing unit 33a processes the image signal output from the I/F circuit 32 to output the processed image signal to the image output circuit 34. After rearranging pixel information and correcting a defective pixel, the image signal processing unit 33a performs enhancement processes such as demosaicing, knee correction, gamma correction, detailing, and matrixing. The synchronization signal generating unit 33b generates a synchronization signal used for the imaging by the CMOS image sensor 20a. This synchronization signal is generated at predetermined intervals corresponding to a set frame rate (in the first embodiment, every 1/60 seconds). The generated synchronization signal is output to a MPU 36c and is also transmitted from the I/F circuit 32 to the head 20 via the camera cable 50 connected to the connection terminal 31.

The image output circuit 34 includes a D/A converter 34a and a DVI (Digital Visual Interface) transmitter 34b. The image output circuit 34 outputs the image signal processed by the image signal processing circuit 33 to an external monitor (not shown) as an analog signal and a digital RGB (red, green, blue) signal.

The motion determination circuit 35 includes a motion detecting unit 35a (detecting module) and a comparing unit 35b (comparing module). The motion detecting unit 35a fetches an image output from the image signal processing unit 33a. The motion detecting unit 35a calculates an average value $V_M$ of absolute values of motion vector of the entire fetched image (hereinafter, simply referred to as the average value $V_M$).

The average value $V_M$ of the motion vector is calculated in the following manner, for instance. The motion detecting unit 35a divides the fetched image into a plurality of areas (for example, 16 areas) and calculates the absolute value of the motion vector in each of the divided areas by using a known method. Next, the motion detecting unit 35a adds the calculated absolute values of the motion vector in the respective areas. Next, the motion detecting unit 35a divides the sum of the absolute values of the motion vector by the number of the areas to calculate the average value $V_M$ of the motion vector.

Threshold values $TH_1$, $TH_2$ are stored in the comparing unit 35b. The comparing unit 35b compares the average value $V_M$ of the motion vector calculated by the motion detecting unit 35a with the stored threshold values $TH_1$, $TH_2$. The threshold values $TH_1$, $TH_2$ are threshold values used for determining a velocity of the motion of an image. The threshold values $TH_1$, $TH_2$ have a relation of $TH_1 > TH_2$. The threshold values $TH_1$, $TH_2$ may be stored in a later-described memory 36a.

In the first embodiment, the endoscope device 1 determines the motion of an image in the following manner based on the relation between the average value $V_M$ of the motion vector and the threshold values $TH_1$, $TH_2$.

$V_M > TH_2$: fast $TH_2 \geq V_M \geq TH_1$: normal $TH_1 > V_M$: slow

The system control circuit 36 includes the memory 36a, an OSD (On-Screen Display) controller 36b, the MPU (Micro Processing Unit) 36c, a receiving unit 36d, and an operation accepting unit 36e. The system control circuit 36 controls the operation of the whole endoscope device 1.

Figures 4, 5:
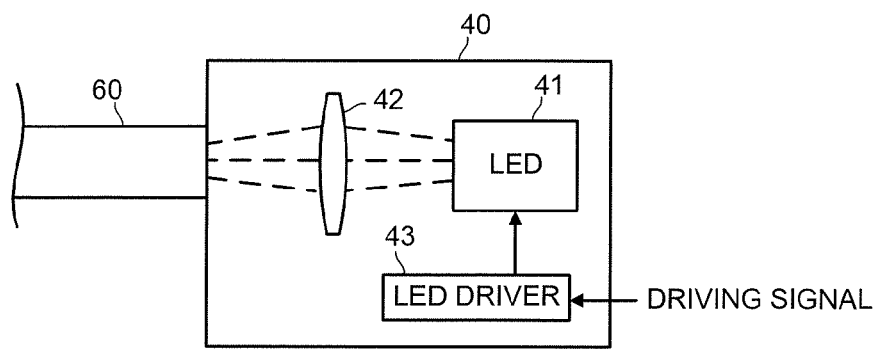
FIG. 4 is a chart showing table data stored in a memory.
FIG. 5 is a block diagram of a light source included in the endoscope device according to the first embodiment.

The memory 36a is, for example, an EEPROM (Electrically Erasable Programmable Read-Only Memory) or a flash memory. Programs for operating the MPU 36c, later-described table data, and so on are stored in the memory 36a. FIG. 4 is a chart showing the table data stored in the memory 36a. In the table data shown in FIG. 4, irradiation time and luminance corresponding to the comparison result by the comparing unit 35b are stored.

The MPU 36c controls the head 20, the CCU 30, and the light source 40 based on a remote control signal received by the receiving unit 36d, the process contents accepted by the operation accepting unit 36e, and setting information stored in the memory 36a. The MPU 36c has therein a timer T for measuring time (hereinafter, referred to as a built-in timer T).

The MPU 36c refers to the table data in FIG. 4 stored in the memory 36a and controls the irradiation time and the luminance of a LED 41 based on the comparison result by the comparing unit 35b. The irradiation times $T_1$ to $T_3$ satisfy a relation of $T_3 > T_2 > T_1$. That is, they are in such a relation that the irradiation time $T_1$ is the shortest irradiation time and the irradiation time $T_3$ is the longest irradiation time. Further, the luminances (lightnesses) $B_1$ to $B_3$ satisfy a relation of $B_1 > B_2 > B_3$. That is, they are in such a relation that the luminance $B_1$ is the highest (lightest) luminance and the luminance $B_3$ is the lowest (darkest) luminance.

Generally, the longer the irradiation time is, the higher sensitivity is. However, increasing the irradiation time when a motion of a subject is fast might cause a distortion in an image. On the other hand, when the motion is slow, the image might be less distorted. Therefore, in the first embodiment, the irradiation time is decreased when the motion of a subject is fast and the irradiation time is increased when the motion of the subject is slow.

The luminance is preferably set higher in order to ensure sensitivity, but in the endoscope device 1, since a subject is the inside of the body of a patient, high luminance might cause the patient to feel hot at his affected area or cause a damage due to heat. Therefore, in the first embodiment, the luminance is changed according to the irradiation time. Concretely, when the irradiation time is short, the luminance is set high, and when the irradiation time is long, the luminance is set low. In this case, by setting the luminance low when the irradiation time is long, it is possible to reduce a load to an affected part.

The OSD controller 36b superimposes text data, a bit map, and the like on the image of the image signal processed by the image signal processing unit 33a to display the resultant.

The receiving unit 36d receives the control signal for remote control transmitted from an external PC or the like. The receiving unit 36d outputs the received control signal to the MPU 36c. For the communication with the external PC, a serial port for RS323-C is used. The operation accepting unit 36e accepts a process instructed through the operation of an external operation key and outputs it to the MPU 36c.

The power supply circuit 37 converts power supplied from an external power source to a predetermined voltage and supplies the power to each circuit in the CCU 30. Further, the power converted by the power supply circuit 37 is also supplied to the head 20 via the camera cable 50 connected to the connection terminal 31.

FIG. 5 is a block diagram of the light source 40. The light source 40 includes the LED (Light Emitting Diode) 41, a lens 42, and a LED driver 43. The optical fiber 60 is connected to the light source 40. The LED 41 emits light to irradiate the imaging range of the CMOS image sensor 20a. The lens 42 leads the light from the LED 41 to the optical fiber 60. The light led to the optical fiber 60 is led to the tip portion of the scope 10 to irradiate the imaging range of the CMOS image sensor 20a.

The LED driver 43 controls the light emission time (irradiation time) and lightness (luminance) of the LED 41 based on a driving signal output from the MPU 36c of the CCU 30. For controlling the lightness of the LED 41, a value of a current supplied to the LED 41 is changed. Instead of changing the value of the current supplied to the LED 41, an aperture adjusting a quantity of the light from the LED 41 may be provided. Alternatively, a rotary shutter shielding the light of the LED 41 may be provided. Further, instead of the LED 41, a lamp (for example, a xenon lamp) may be used.

(Pseudo Global Shutter)

In the endoscope device 1, in addition to the control over the aforesaid irradiation time and luminance, pseudo global shutter to be described next is adopted. The endoscope device 1 adopts the pseudo global shutter in addition to the aforesaid changing of the irradiation time according to the velocity of the motion of the subject, thereby further reducing the distortion of an image captured by the CMOS image sensor 20a. Hereinafter, the pseudo global shutter will be described.

Figure 6:
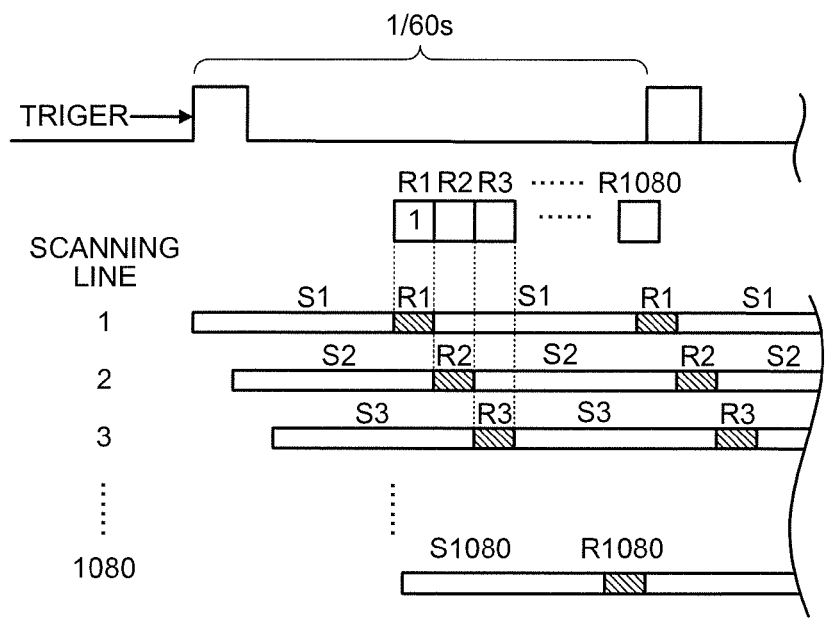
FIG. 6 is an explanatory chart of rolling shutter (line exposure).
Figure 7:
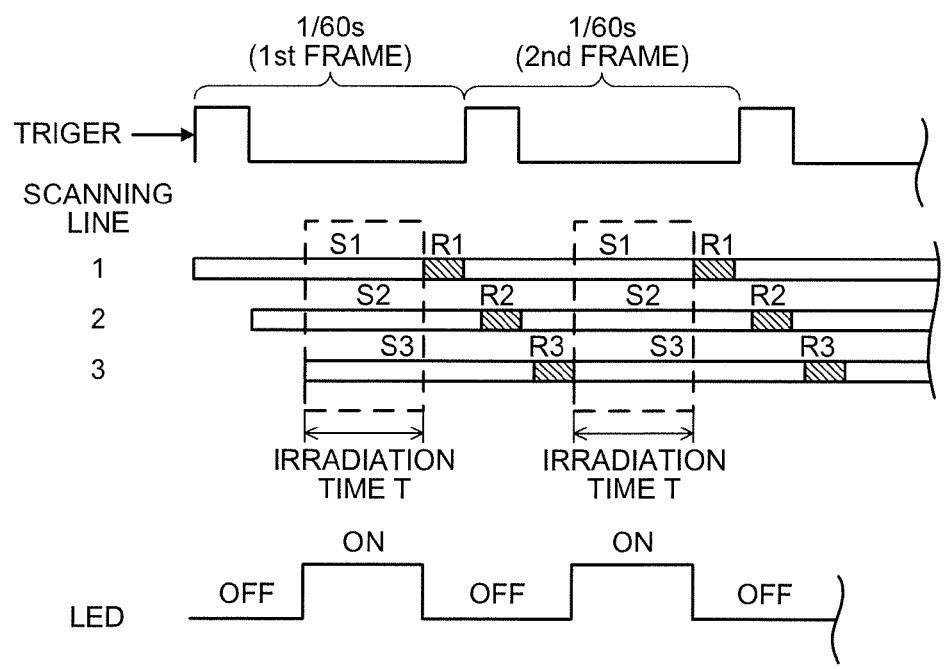
FIG. 7 is an explanatory chart of pseudo global shutter in the first embodiment.

First, an imaging method of the CMOS image sensor 20a according to the first embodiment will be described. FIG. 6 is an explanatory chart of rolling shutter (line exposure). FIG. 7 is an explanatory chart of the pseudo global shutter. Hereinafter, the imaging method of the CMOS image sensor 20a according to the first embodiment will be described with reference to FIG. 6 and FIG. 7.

The numerical values written in the vertical direction in FIG. 6 represent the numbers assigned to respective scanning lines. FIG. 6 shows a case where the number of the scanning lines is 1080. S1 to S1080 in FIG. 6 represent charge accumulation periods in the respective scanning lines. R1 to R1080 represent charge reading periods in the respective scanning lines.

When the synchronization signal (trigger) is transmitted from the synchronization signal generating unit 33b of the CCU 30, line exposure is started. In the line exposure, electric charges are accumulated in phototransistors (photoelectric conversion elements) in units of each of the scanning lines 1 to 1080. The electric charge accumulated in each of the phototransistors is converted to a voltage and thereafter is amplified and read. In each of the scanning lines 1 to 1080, after the charge reading is finished, the next charge accumulation continuously takes place.

As described above, in the line exposure, the reading is performed in units of each of the scanning lines 1 to 1080. Therefore, as shown in FIG. 6, a start and an end of an accumulation period differ depending on each of the scanning lines 1 to 1080. As a result, when a subject is moving, an image captured by the CMOS image sensor 20a is distorted.

Hereinafter, the pseudo global shutter will be described with reference to FIG. 7. The numerical values written in the vertical direction in FIG. 7 represent the numbers assigned to the respective scanning lines (lines). In FIG. 7, for simplifying the description, it is assumed that the number of the scanning lines is three. S1 to S3 in FIG. 7 represent charge accumulation periods in the respective scanning lines. R1 to R3 represent charge reading periods in the respective scanning lines. The ON/OFF timing of the LED 41 is shown in FIG. 7.

First, when the synchronization signal (trigger) is transmitted from the synchronization signal generating unit 33b of the CCU 30, the line exposure is started. When the line exposure is started, electric charges are accumulated in the phototransistors on a scanning line-by-scanning line basis, and thereafter the electric charge accumulated in each of the phototransistors is converted to a voltage. The converted voltage is read after amplified. In each of the scanning lines, after the charge reading is finished, the next charge accumulation continuously takes place.

When the synchronization signal is output from the synchronization signal generating unit 33b, the MPU 36c activates the built-in timer T. After the irradiation start time stored in the memory 36a is reached, the MPU 36c outputs a control signal to the light source 40 so that the imaging range of the CMOS image sensor 20a is irradiated. The MPU 36c controls the irradiation time and the luminance based on the comparison result by the comparing unit 35b.

The irradiation times $T_1$ to $T_3$ written in the table data described in FIG. 4 are adjusted in advance so as to fall within a span, shown by the broken line in FIG. 7, during which the charge accumulation periods of the respective scanning lines overlap with one another. That is, the irradiation times $T_1$ to $T_3$ are set so as to be shorter than the irradiation time T shown in FIG. 7.

The MPU 36c measures the irradiation time by the built-in timer T, and when the irradiation time corresponding to the comparison result by the comparing unit 35b passes, the MPU 36c outputs a control signal to the light source 40 to finish the irradiation of the imaging range of the CMOS image sensor 20a. When the irradiation time passes, the MPU 36c resets the built-in timer T to be prepared for the time measurement in the next frame.

As described above, the MPU 36c controls the irradiation period so that the irradiation period falls within the span, shown by the broken line in FIG. 7, during which the charge accumulation periods of the respective scanning lines overlap with one another, and irradiates a subject for the irradiation time and with the luminance corresponding to the comparison result by the comparing unit 35b.

(Operation of Endoscope Device 1)

Figure 8:
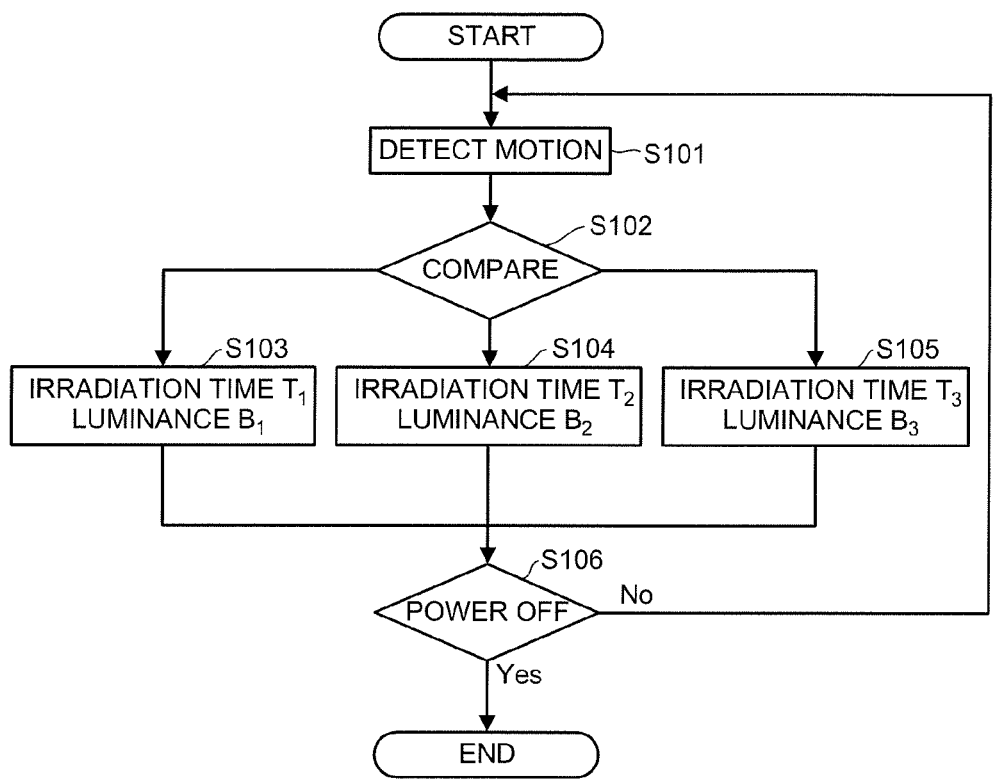
FIG. 8 is a flowchart showing the operation of the endoscope device according to the first embodiment.

FIG. 8 is a flowchart showing the operation of the endoscope device 1 according to the first embodiment. Hereinafter, the operation of the endoscope device 1 will be described with reference to FIG. 8. First, the motion detecting unit 35a calculates the average value $V_M$ of the motion vector in an image fetched from the image signal processing unit 33a (Step S101).

The comparing unit 35b compares the average value $V_M$ of the motion vector calculated by the motion detecting unit 35a with the threshold values $TH_1$, $TH_2$ (Step S102).

The MPU 36c refers to the table data in FIG. 4 stored in the memory 36a and controls the irradiation time and the luminance of the LED 41 based on the comparison result by the comparing unit 35b. Concretely, when the comparison result by the comparing unit 35b is $V_M > TH_2$, the MPU 36c controls the LED driver 43 of the light source 40 so that the irradiation time becomes $T_1$ and the luminance becomes $B_1$ (Step S103).

When the comparison result by the comparing unit 35b is $TH_2 \geq V_M \geq TH_1$, the MPU 36c controls the LED driver 43 of the light source 40 so that the irradiation time becomes $T_2$ and the luminance becomes $B_2$ (Step S104).

When the comparison result by the comparing unit 35b is $TH_1 > V_M$, the MPU 36c controls the LED driver 43 of the light source 40 so that the irradiation time becomes $T_3$ and the luminance becomes $B_3$ (Step S105).

The system control circuit 36 continues the above operation until the operation is finished, that is, until the power of the endoscope device 1 is turned off (Step S106).

As described above, the endoscope device 1 according to the first embodiment changes the irradiation time and the luminance according to the motion of a subject. Therefore, the endoscope device 1 is capable of reducing the distortion of an image captured by the CMOS image sensor 20a. Further, the endoscope device 1 decreases the luminance when the irradiation time is long. Therefore, the endoscope device 1 is capable of reducing a load to an affected part. Further, the endoscope device 1 performs the control so that the irradiation period falls within the span during which the charge accumulation periods of the respective scanning lines included in the CMOS image sensor 20a overlap with one another. Therefore, the endoscope device 1 is capable of further reducing the distortion of an image captured by the CMOS image sensor 20a.

Further, using the CMOS image sensor 20a as an image sensor, the endoscope device 1 does not require a plurality of voltages and its operating voltage is low. Therefore, the endoscope device 1 does not require a power source generating a plurality of kinds of voltages and thus is capable of reducing manufacturing cost and power consumption of an imaging device. Further, the CMOS image sensor is capable of higher density mounting of elements compared with a CCD image sensor, which can further downsize the endoscope device 1.

In the above description, the average value $V_M$ of the motion vector calculated by the motion detecting unit 35a is compared with the two threshold values $TH_1$, $TH_2$, but the number of the threshold values with which the average value $V_M$ of the motion vector is compared is not limited to two. For example, the number of the threshold values may be only one or may be three or more, for instance.

Second Embodiment

In the first embodiment, a description is given of the embodiment where the irradiation period is set to fall within the span in one frame from the charge accumulation start of the final scanning line to the charge accumulation end of the first scanning line, and the irradiation time and the luminance are changed according to the motion of an image.

In a second embodiment, a description is given of an embodiment where, according to the motion of an image, a mode is changed between a mode where the irradiation period is set to fall within a span in one frame from a charge accumulation start of the final scanning line to a charge accumulation end of the first scanning line (a first operation mode) and a mode where the irradiation period is set to fall within a span from a charge accumulation start of the final scanning line to a charge accumulation end of the first scanning line, which span extends over a plurality of frames (a second operation mode).

Figure 9:
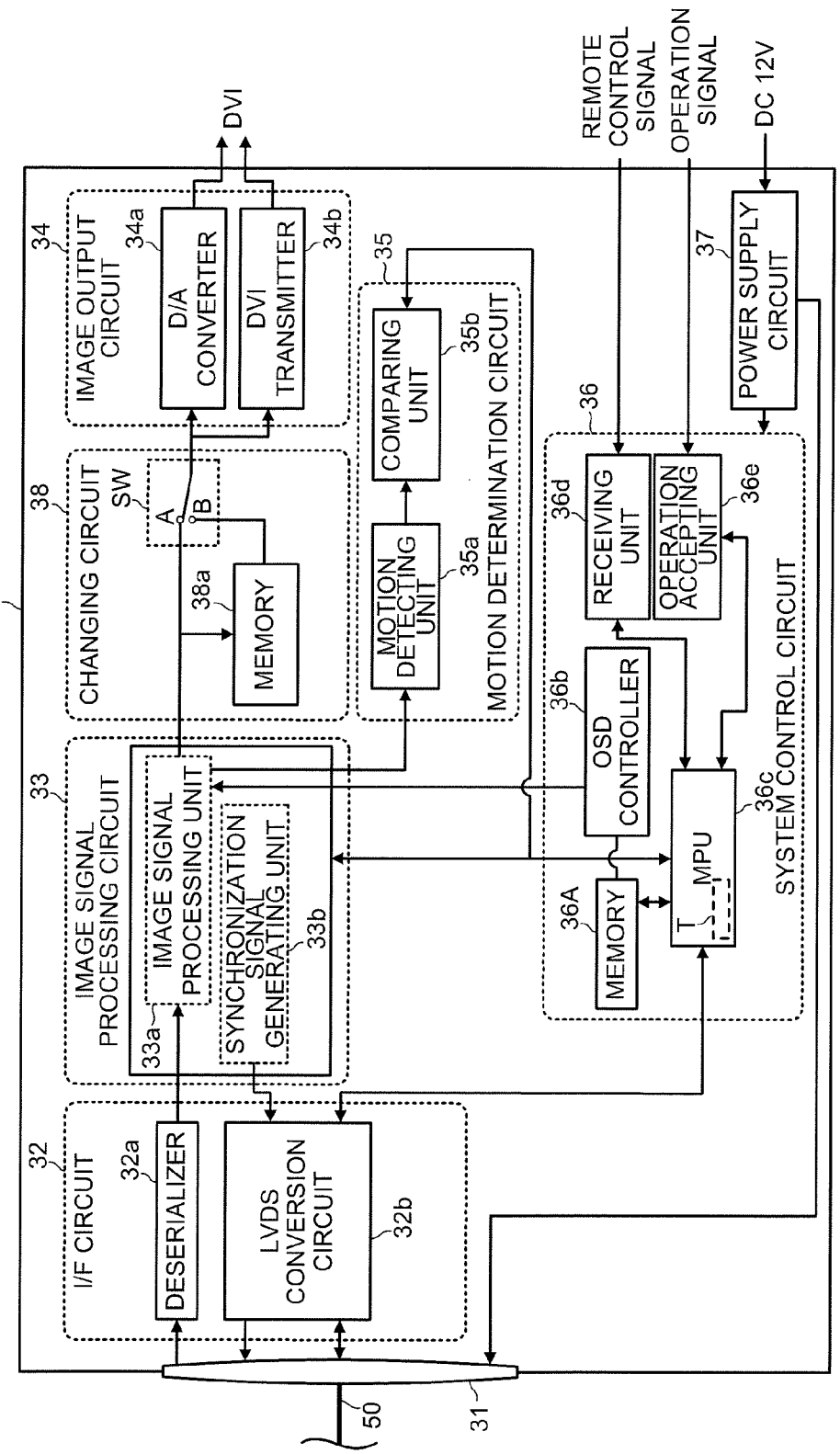
FIG. 9 is a block diagram of a CCU included in an endoscope device according to a second embodiment.

FIG. 9 is a block diagram of a CCU 30A included in an endoscope device 2 according to the second embodiment (hereinafter, referred to as the endoscope device 2). Hereinafter, the structure of the endoscope device 2 will be described with reference to FIG. 9. Note that the same structures as the structures included in the endoscope device 1 will be denoted by the same reference numerals and symbols and a redundant description thereof will be omitted. Further, structures except the CCU 30A included in the endoscope device 2 (a scope 10, a head 20, and a light source 40) are the same as the structures included in the endoscope device 1, and therefore a redundant description thereof will be omitted.

The CCU 30A included in the endoscope device 2 further includes a changing circuit 38. According to a motion of an image, the changing circuit 38 changes between the first operation mode where the irradiation period is set to fall within the span in one frame from the charge accumulation start of the final scanning line to the charge accumulation end of the first scanning line and the second operation mode where the irradiation period is set to fall within the span from the charge accumulation start of the final scanning line to the charge accumulation end of the first scanning line, which span extends over a plurality of frames.

In the second embodiment, a synchronization signal is output from a synchronization signal generating unit 33b every 1/60 seconds in the first operation mode, but in the second operation mode, the synchronization signal is output from the synchronization signal generating unit 33b every 1/30 seconds. That is, in the first operation mode, a frame rate of an image signal output from an image sensor 20a is 60 fps, but in the second operation mode, the frame rate of the image signal output from the image sensor 20a is 30 fps.

To realize this operation, in the second operation mode, a MPU 36c instructs the synchronization signal generating unit 33b to output the synchronization signal at an interval twice as long as that in the first operation mode (1/60 seconds), that is, every 1/30 seconds.

The changing circuit 38 includes a memory 38a and a switch SW and has a function of converting the frame rate of the image signal output from the image sensor 20a to 60 fps (frames per second). The memory 38 stores (accumulates) and outputs the image signal output from the CMOS image sensor 20a based on the control from the MPU 36c.

The switch SW changes a connection destination according to the instruction from the MPU 36c. In the first operation mode, the switch SW is left connected to a terminal A. In the first operation mode, since the frame rate of the image signal output from the image sensor 20a is 60 fps, the image signal output from the image sensor 20a is output as it is to an image output circuit 34.

In the second operation mode, the connection destination of the switch SW is alternately changed from the terminal A to a terminal B and from the terminal B to the terminal A every 1/60 seconds. In the second operation mode, the frame rate of the image signal output from the image sensor 20a is 30 fps. Therefore, after the frame rate is changed to 60 fps by the changing circuit 38, the image signal is output to the image output circuit 34.

Specifically, in the second operation mode, the image signal from the image sensor 20a that is output only every 1/30 seconds is divided into two lines, one of them is output as it is to the image output circuit 34, the other one is once stored in the memory 38a, and 1/60 seconds later, this stored image signal is output to the image output circuit 34, whereby the frame rate is changed from 30 fps to 60 fps. As a result, in the second operation mode, the same image signal is output twice at a 1/60 second interval.

Figures 10, 11:
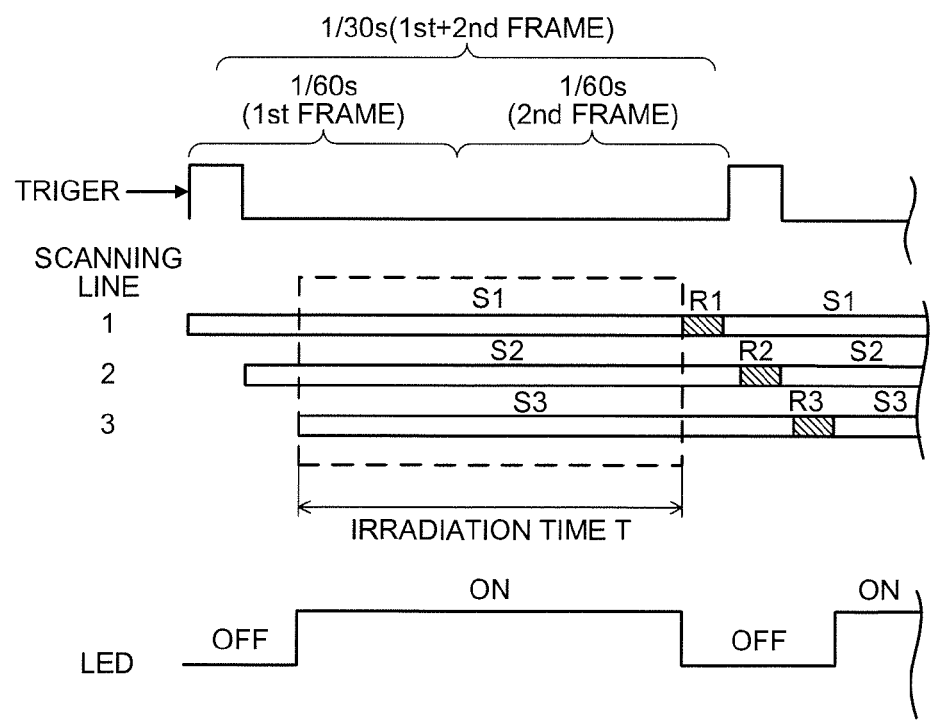
FIG. 10 is a chart showing table data stored in a memory.
FIG. 11 is an explanatory chart of pseudo global shutter in the second embodiment.

A memory 36A is an EEPROM or a flash memory, for instance, and programs for operating the MPU 36c, later-described table data, and so on are stored therein. FIG. 10 is a chart showing the table data stored in the memory 36A. In the table data shown in FIG. 10, the operation mode is written in addition to irradiation time and luminance corresponding to a comparison result by a comparing unit 35b.

The MPU 36C controls the head 20, the CCU 30A, and the light source 40 based on a remote control signal received by a receiving unit 36d, the process contents accepted by an operation accepting unit 36e, and setting information stored in the memory 36A. The MPU 36c has therein a timer T measuring time (hereinafter, referred to as a built-in timer T).

The MPU 36c refers to the table data in FIG. 10 stored in the memory 36A and controls the irradiation time, the luminance, and the operation mode of a LED 41 based on the comparison result by the comparing unit 35b. When the comparison result by the comparing unit 35b is $V_M > TH_2$ and when the comparison result by the comparing unit 35b is $TH_2 \geq V_M \geq TH_1$, the MPU 36c sets the connection destination of the switch SW to the terminal A to operate in the first operation mode. Further, when the comparison result by the comparing unit 35b is $TH_1 > V_M$, the MPU 36c sets the connection destination of the switch SW to the terminal B to operate in the second operation mode.

FIG. 11 is an explanatory chart of pseudo global shutter in the second operation mode. Hereinafter, the second operation mode will be described with reference to FIG. 11. Note that in the description below, a description will be given of a case where the frame rate of the image signal output from the image sensor 20a in the second operation mode is half of that in the first operation mode. Further, since the first operation mode has been described in the first embodiment with reference to FIG. 7, a redundant description thereof will be omitted.

The numerical values written in the vertical direction in FIG. 11 represent the numbers assigned to respective scanning lines. In FIG. 11, it is assumed that the number of the scanning lines is three for simplifying the description. Further, S1 to S3 in FIG. 11 represent charge accumulation periods in the respective scanning lines. R1 to R3 represent charge reading periods in the respective scanning lines. In FIG. 11, the ON/OFF timing of the LED 41 is also shown.

First, the MPU 36c instructs the synchronization signal generating unit 33b to set a rate of the synchronization signal to half of that in the first operation mode, that is, to output the synchronization signal every 1/30 seconds. Next, the MPU 36c changes the connection destination of the switch SW from the terminal A to the terminal B and from the terminal B to the terminal A every 1/60 seconds.

When the synchronization signal (trigger) is transmitted from the synchronization signal generating unit 33b of the CCU 30A, line exposure is started. Electric charges accumulated in phototransistors on a scanning line-by-scanning line basis is converted to a voltage, and thereafter is amplified and read. In each of the scanning lines, after the charge reading, the next charge accumulation continuously takes place.

When the synchronization signal is output from the synchronization signal generating unit 33b, the MPU 36c activates the built-in timer T. The MPU 36c outputs a control signal to the light source 40 to start the irradiation of an imaging range of the CMOS image sensor 20a. The MPU 36c controls the irradiation time and the luminance based on the comparison result by the comparing unit 35b.

The irradiation time $T_4$ written in the table data described in FIG. 10 is adjusted in advance so as to fall within a span, shown by the broken line in FIG. 11, during which the charge accumulation periods of the respective scanning lines overlap with one another. That is, the irradiation time $T_4$ is set so as to be shorter than the irradiation time T shown in FIG. 11.

The MPU 36c measures the irradiation time by the built-in timer T, and when the irradiation time $T_4$ corresponding to the comparison result by the comparing unit 35b passes, the MPU 36c outputs a control signal to the light source 40 to end the irradiation of the imaging range of the CMOS image sensor 20a. When the irradiation is finished, the MPU 36c resets the built-in timer T to be prepared for the time measurement in the next frame.

(Operation of Endoscope Device 2)

Figure 12:
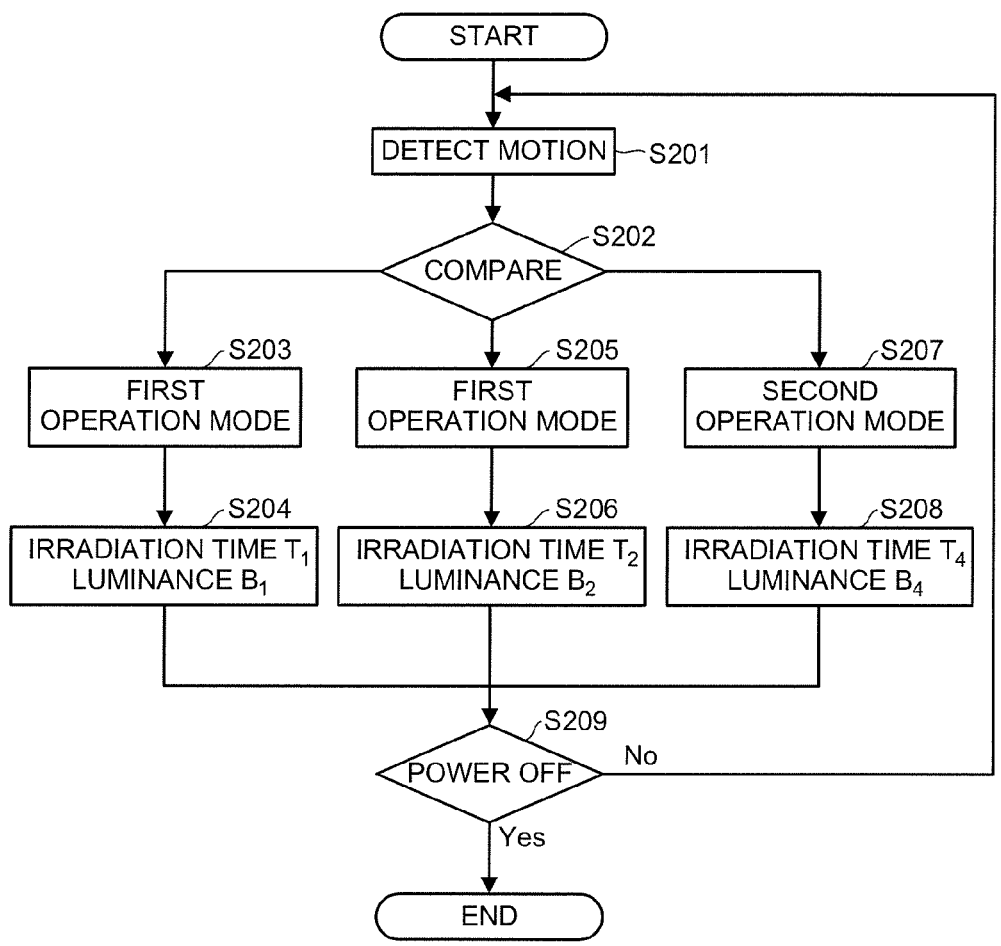
FIG. 12 is a flowchart showing the operation of the endoscope device according to the second embodiment.

FIG. 12 is a flowchart showing the operation of the endoscope device 2. Hereinafter, the operation of the endoscope device 2 will be described with reference to FIG. 12. First, a motion detecting unit 35a calculates an average value $V_M$ of a motion vector from an image fetched from an image signal processing unit 33a (Step S201).

The comparing unit 35b compares the average value $V_M$ of the motion vector calculated by the motion detecting unit 35a with threshold values $TH_1$, $TH_2$ (Step S202).

The MPU 36c refers to the table data in FIG. 10 stored in the memory 36A and controls the irradiation time and the luminance of the LED 41 and the operation mode based on the comparison result by the comparing unit 35b. Concretely, when the comparison result by the comparing unit 35b is $V_M > TH_2$, the MPU 36c connects the switch SW to the terminal A side to operate in the first operation mode (Step S203) and controls a LED driver 43 of the light source 40 so that the irradiation time becomes $T_1$ and the luminance becomes $B_1$ (Step S204).

When the comparison result by the comparing unit 35b is $TH_2 \geq V_M \geq TH_1$, the MPU 36c connects the switch SW to the terminal A side to operate in the first operation mode (Step S205), and controls the LED driver 43 of the light source 40 so that the irradiation time becomes $T_2$ and the luminance becomes $B_2$ (Step S206).

When the comparison result by the comparing unit 35b is $TH_1 > V_M$, the MPU 36c connects the switch SW to the terminal A side to operate in the second operation mode (Step S207), and controls the LED driver 43 of the light source 40 so that the irradiation time becomes $T_4$ and the luminance becomes $B_4$ (Step S208).

A system control circuit 36 continues the above operation until the operation is finished, that is, until power of the endoscope device 2 is turned off (Step S209).

As described above, when the motion of a subject is slow, the endoscope device 2 changes to the second operation mode where the irradiation period is set to fall within the span from the charge accumulation start of the final scanning line to the charge accumulation end of the first scanning line, which span extends over the plural frames. This has an effect that the irradiation time becomes longer to improve sensitivity of an image. The other effects are the same as those of the endoscope device 1.

In the above description, when the comparison result by the comparing unit 35b is $TH_2 \geq V_M \geq TH_1$, the operation mode is changed to the first operation mode but may be changed to the second operation mode. Further, similarly to the first embodiment, the number of the threshold values with which the average value $V_M$ of the motion vector is compared may be only one or may be three or more.

Further, in the first and second embodiments described above, the irradiation time and the luminance (lightness) are changed based on the comparison result by the comparing unit 35b, but another possible structure may be to receive an external change signal by the receiving unit 36d or the operation accepting unit 36e, and change the irradiation time and the luminance (lightness) based on the received change signal. Further, in the second embodiment, the first operation mode and the second operation mode are changed based on the comparison result by the comparing unit 35b, but another possible structure may be to receive an external change signal by the receiving unit 36d or the operation accepting unit 36e and change the first operation mode and the second operation mode based on the received change signal.

Other Embodiments

While certain embodiments have been described, these embodiments have been presented by way of example only, and are not intended to limit the scope of the inventions. Indeed, the novel embodiment described herein may be embodied in a variety of other forms; furthermore, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging device, comprising:
a CMOS image sensor configured to have a plurality of photoelectric conversion elements corresponding to a plurality of lines, with start of an accumulation period of electric charge by the plural photoelectric conversion elements being different depending on each of the lines, and read the accumulated electric charge to repeatedly output the read electric charge as an image signal;
a light source configured to irradiate an imaging range of the CMOS image sensor;
a detector configured to detect a motion vector of an image imaged by the CMOS image sensor;
a comparator configured to compare the motion vector detected by the detector with a threshold value; and
a controller configured to control the light source so as to cause the light source to irradiate the imaging range within a span during which the accumulation periods of the plural photoelectric conversion elements overlap with one another, and
wherein the controller sets a first irradiation time of the light source when the value of the motion vector detected by the detector is smaller than the threshold value, and sets a second irradiation time of the light source shorter than the first irradiation time when the value of the motion vector detected by the detector is equal to or larger than the threshold value.

2. The device of claim 1,
wherein the controller decreases luminance of the light source when setting the first irradiation time, and increases the luminance of the light source when setting the second irradiation time.

3. The device of claim 1,
wherein the controller controls the light source so as to cause a start and an end of the irradiation to fall within a span, in one frame, during which the accumulation periods overlap with one another.

4. The device of claim 1, further comprising:
a receiver configured to receive a change signal of at least one of the irradiation time and luminance of the light source,
wherein the controller changes at least one of the irradiation time and the luminance of the light source according to a receiving result of the receiver.

5. An imaging device, comprising:
a CMOS image sensor configured to have a plurality of photoelectric conversion elements corresponding to a plurality of lines, with start of an accumulation period of electric charge by the plural photoelectric conversion elements being different depending on each of the lines, and read the accumulated electric charge to repeatedly output the read electric charge as an image signal;
a light source configured to irradiate an imaging range of the CMOS image sensor;
a detector configured to detect a motion vector of an image imaged by the CMOS image sensor; and
a controller configured to control the light source so as to cause the light source to irradiate the imaging range within a span during which the accumulation periods of the plural photoelectric conversion elements overlap with one another based on comparison of the motion vector detected by the detector with a threshold value.

6. The device of claim 5,
wherein the controller decreases luminance of the light source when setting a first irradiation time, and increases the luminance of the light source when setting a second irradiation time shorter than the first irradiation time.

7. An endoscope device, comprising:
a scope inserted into an inspection target;
a CMOS image sensor provided at a tip of the scope, the CMOS image sensor configured to have a plurality of photoelectric conversion elements corresponding to a plurality of lines, with start of an accumulation period of electric charge by the plural photoelectric conversion elements being different depending on each of the lines, and read the accumulated electric charge to repeatedly output the read electric charge as an image signal;
a light source configured to irradiate an imaging range of the CMOS image sensor;
a detector configured to detect a motion vector of an image imaged by the CMOS image sensor;
a comparator configured to compare the motion vector detected by the detector with a threshold value;
a controller configured to control the light source so as to cause the light source to irradiate the imaging range within a span during which the accumulation periods of the plural photoelectric conversion elements overlap with one another; and
a monitor configured to display an image signal output from the CMOS image sensor as an image, and
wherein the controller sets a first irradiation time of the light source when the value of the motion vector detected by the detector is smaller than the threshold value, and sets a second irradiation time of the light source shorter than the first irradiation time when the value of the motion vector detected by the detector is equal to or larger than the threshold value.

8. The device of claim 7,
wherein the controller decreases luminance of the light source when setting the first irradiation time, and increases the luminance of the light source when setting the second irradiation time.

9. The device of claim 7,
wherein the controller controls the light source so as to cause a start and an end of the irradiation to fall within a span, in one frame, during which the accumulation periods overlap with one another.

10. The device of claim 7, further comprising:
a receiver configured to receive a change signal of at least one of the irradiation time and luminance of the light source,
wherein the controller changes at least one of the irradiation time and the luminance of the light source according to a receiving result of the receiver.

11. An endoscope device, comprising:
a scope inserted into an inspection target;
a CMOS image sensor provided at a tip of the scope, the CMOS image sensor configured to have a plurality of photoelectric conversion elements corresponding to a plurality of lines, with start of an accumulation period of electric charge by the plural photoelectric conversion elements being different depending on each of the lines, and read the accumulated electric charge to repeatedly output the read electric charge as an image signal;
a light source configured to irradiate an imaging range of the CMOS image sensor;
a detector configured to detect a motion vector of an image imaged by the CMOS image sensor;
a controller configured to control the light source so as to cause the light source to irradiate the imaging range within a span during which the accumulation periods of the plural photoelectric conversion elements overlap with one another based on comparison of the motion vector detected by the detector with a threshold value; and a monitor configured to display an image signal output from the CMOS image sensor as an image.

12. The device of claim 11, wherein the controller decreases luminance of the light source when setting a first irradiation time, and increases the luminance of the light source when setting a second irradiation time shorter than the first irradiation time.

13. A running method of an imaging device comprising a CMOS image sensor configured to have a plurality of photoelectric conversion elements corresponding to a plurality of lines, with start of an accumulation period of electric charge by the plural photoelectric conversion elements being different depending on each of the lines, and read the accumulated electric charge to repeatedly output the read electric charge as an image signal, a light source for exposure, a controller configured to control the light source, a detector configured to detect a motion vector of an image imaged by the CMOS image sensor and a comparator configured to compare the motion vector detected by the detector with a threshold value, irradiating an imaging range of the CMOS image sensor by the light source;

controlling the light source so as to cause the light source to irradiate the imaging range within a span during which the accumulation periods of the plural photoelectric conversion elements overlap with one another by the controller;

setting a first irradiation time of the light source when the value of the motion vector detected by the detector is smaller than the threshold value by the controller; and setting a second irradiation time of the light source shorter than the first irradiation time when the value of the motion vector detected by the detector is equal to or larger than the threshold value by the controller.

14. The method of claim 13, wherein the controller decreases luminance of the light source when setting the first irradiation time, and increases the luminance of the light source when setting the second irradiation time.

15. The method of claim 13, wherein the controller controls the light source so as to cause a start and an end of the irradiation to fall within a span, in one frame, during which the accumulation periods overlap with one another.

16. The method of claim 13, further comprising:

receiving a change signal of at least one of the irradiation time and luminance of the light source by an receiver, wherein the controller changes at least one of the irradiation time and the luminance of the light source according to an receiving result of the receiver.

17. A running method of an imaging device comprising a CMOS image sensor configured to have a plurality of photoelectric conversion elements corresponding to a plurality of lines, with start of an accumulation period of electric charge by the plural photoelectric conversion elements being different depending on each of the lines, and read the accumulated electric charge to repeatedly output the read electric charge as an image signal, a light source for exposure, a detector configured to detect a motion vector of an image imaged by the CMOS image sensor and a controller configured to control the light source, irradiating an imaging range of the CMOS image sensor by the light source;

detecting a motion vector of the CMOS image sensor by the detector; and controlling the light source so as to cause the light source to irradiate the imaging range within a span during which the accumulation periods of the plural photoelectric conversion elements overlap with one another based on comparison of the motion vector detected by the detector with a threshold value by the controller.

18. The method of claim 17, wherein the controller decreases luminance of the light source when setting a first irradiation time, and increases the luminance of the light source when setting a second irradiation time shorter than the first irradiation time.

* * * * *